United States Patent
Pisila et al.

(10) Patent No.: US 9,605,619 B2
(45) Date of Patent: Mar. 28, 2017

(54) PISTON FOR INTERNAL COMBUSTION ENGINE

(75) Inventors: Sakari Pisila, Kokkola (FI); Tommy Ronnskog, Jakobstad (FI)

(73) Assignee: COMPONENTA FINLAND OY, Karkkila (FI)

( * ) Notice: Subject to any disclaimer, the term of this patent is extended or adjusted under 35 U.S.C. 154(b) by 133 days.

(21) Appl. No.: 14/405,225

(22) PCT Filed: Jun. 4, 2012

(86) PCT No.: PCT/FI2012/050549
§ 371 (c)(1),
(2), (4) Date: Dec. 3, 2014

(87) PCT Pub. No.: WO2013/182732
PCT Pub. Date: Dec. 12, 2013

(65) Prior Publication Data
US 2015/0159583 A1   Jun. 11, 2015

(51) Int. Cl.
*F02F 3/00* (2006.01)
*F02F 3/22* (2006.01)
(Continued)

(52) U.S. Cl.
CPC .......... *F02F 3/0069* (2013.01); *F02F 3/0015* (2013.01); *F02F 3/22* (2013.01);
(Continued)

(58) Field of Classification Search
CPC .......... F02F 3/0069; F02F 3/16; F02F 3/0023; F02F 3/00; F16J 1/16; F16J 1/09;
(Continued)

(56) References Cited

U.S. PATENT DOCUMENTS 2,410,929 A * 11/1946 Crause ............... F16C 3/06
184/11.1
2,843,433 A * 7/1958 Burnand ............. F16J 1/06
92/126
(Continued)

FOREIGN PATENT DOCUMENTS

DE    1476111 A1   10/1970
FR    2435640 A1    4/1980
(Continued)

OTHER PUBLICATIONS

Machine translation of DE1476111, 1970, see "DE147611_MachineTranslation.pdf".*
(Continued)

*Primary Examiner* — Long T Tran
(74) *Attorney, Agent, or Firm* — Young & Thompson

(57) ABSTRACT

A piston assembly for internal combustion diesel engine having a piston diameter of 160-650 mm, the piston assembly including a top part, a body part and a gudgeon pin connectable to each other, the top part defining, when installed in a cylinder, the piston side of a combustion chamber, and the body part having an aperture for a gudgeon pin, bosses for distributing forces between the piston and the gudgeon pin, the body part having an interior, an outer surface and operable connecting surfaces, the gudgeon pin for pivotally connecting the piston to a connecting rod, is configured to be assembled and lockable by locking elements to the body part aperture in a given rotational orientation such that there is provided a conduit for supplying cooling oil from the connecting rod via the gudgeon pin to the bosses and to a cooling gallery between the top and body parts.

17 Claims, 4 Drawing Sheets

Figure 1:
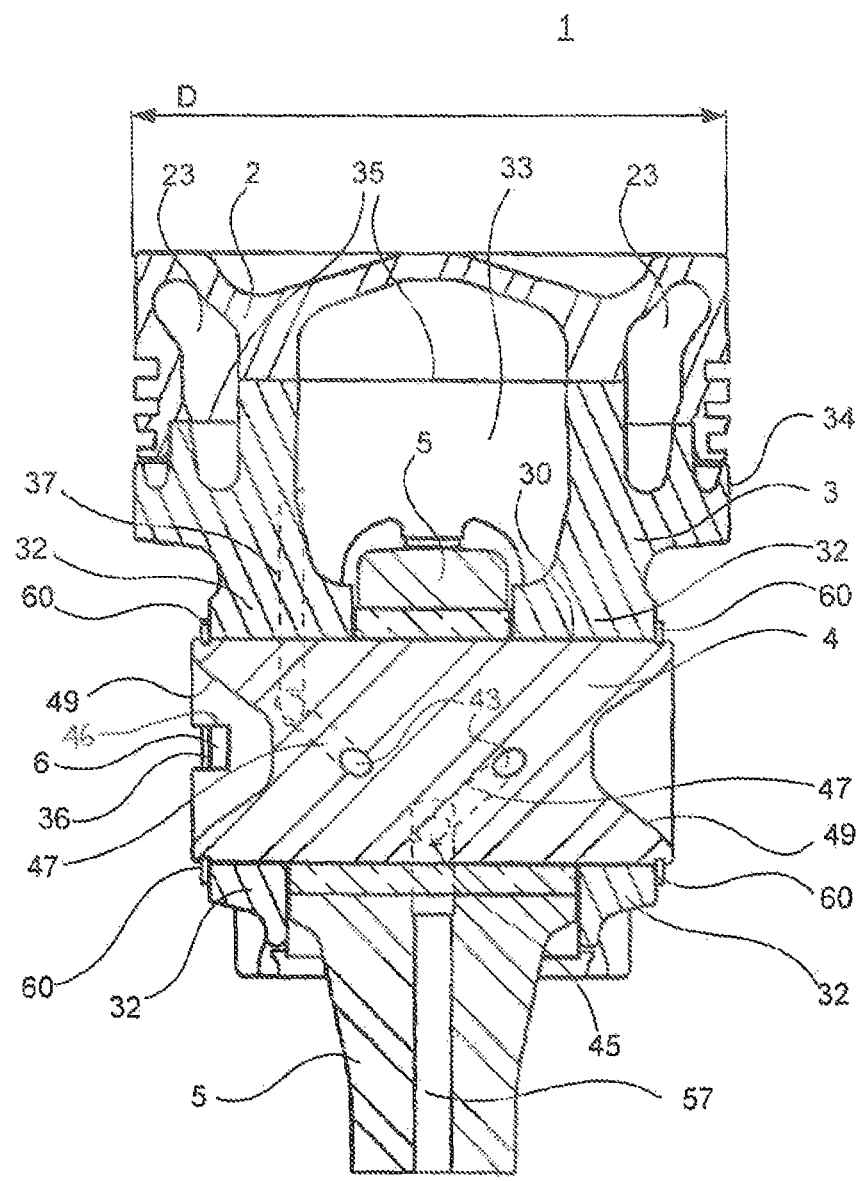

(51) Int. Cl.
 *F16J 1/16* (2006.01)
 *F16J 1/18* (2006.01)
 *F01P 3/10* (2006.01)
(52) U.S. Cl.
 CPC . *F16J 1/16* (2013.01); *F16J 1/18* (2013.01); *F01P 3/10* (2013.01)
(58) Field of Classification Search
 CPC . F16J 1/18; F16J 7/00; F16J 1/08; F16J 1/14; F16J 1/22
 USPC ........... 123/193.6, 193.1; 29/888.04, 888.05, 29/888.051
 See application file for complete search history.

(56) References Cited

U.S. PATENT DOCUMENTS

| | | | | |
|---|---|---|---|---|
| 3,129,966 | A | * | 4/1964 | Blank ................. F16C 5/00 403/150 |
| 3,358,657 | A | | 12/1967 | Herrmann |
| 4,011,797 | A | * | 3/1977 | Cornet ................. F02F 3/003 123/193.6 |
| 4,550,647 | A | | 11/1985 | Coulin |
| 5,628,577 | A | | 5/1997 | Ribeiro et al. |
| 6,401,680 | B1 | * | 6/2002 | Zhu ................. F02B 23/0696 123/193.6 |
| 2003/0188633 | A1 | * | 10/2003 | Griffiths ............ F02F 3/0023 92/208 |

FOREIGN PATENT DOCUMENTS

| | | |
|---|---|---|
| GB | 2031112 A | 4/1980 |
| JP | S56-185954 A | 6/1983 |
| JP | S58-217752 A | 12/1983 |
| SU | 1382982 A1 | 3/1988 |

OTHER PUBLICATIONS

International Search Report, dated Aug. 28, 2012, from corresponding PCT application.
Japanese Patent Application No. 2015-515556, dated Aug. 28, 2012, from corresponding Japanese application, English translation provided.

\* cited by examiner

PISTON FOR INTERNAL COMBUSTION ENGINE

BACKGROUND OF THE INVENTION

The present invention relates to the field of combustion engines, more specifically to a piston assembly for an internal combustion diesel engine having a piston diameter of 160 to 650 mm, the piston assembly comprising a top part and a body part and a gudgeon pin connectable to each other,
- the top part defining, when installed in a cylinder of the engine, the piston side of a combustion chamber, and
- the body part having an aperture for a gudgeon pin, bosses for distributing forces, when in use, between the piston and the gudgeon pin, the body part having an interior, an outer surface and operable connecting surfaces,
- the gudgeon pin for connecting the piston to a connecting rod of the engine in a pivotal manner.

One aspect of the invention relates to the gudgeon pin for use in the piston assembly.

SUMMARY OF THE INVENTION

Another aspect of the invention relates to the piston body part for use in the piston assembly.

Still another aspect of the invention relates to an engine comprising the piston assembly.

Large internal combustion engines are widely used in demanding power supply tasks in electric power plants, as a power source of ship propulsion systems, etc.

In large internal combustion engines there is an increasing demand in having more power out of the engine with the same cylinder displacement. An aim is to increase the power rate and simultaneously decrease emissions caused by the engine. One route towards these results is the increase in cylinder pressure when in operation. On the other hand the reliability of these large engines must also improve i.e. any failures in operation are highly unwanted. This causes development needs to all parts of these engines, pistons included.

An objective of the present invention is to provide a piston for large size internal combustion diesel engines, having a piston diameter in a range of 160 mm to 650 mm. The objective of the invention is to provide a piston and gudgeon pin solution, which can withstand increased cylinder pressures in operation for long periods of time.

Especially the ability to withstand fatigue at elevated power rates of the internal combustion diesel engine is one objective of the present invention. While having a challenging technical task of developing a piston for these increased demands, also the economical aspect of the piston production need to be taken account. A piston is preferably manufactured in such a way that a unit price for one piston is not too high. Therefore a balance of manufacturing costs and technical excellence must be taken in to consideration. At current markets for large sized piston, it is still a product which should not be too expensive and at the same time technically as imperceptible as possible, just working the whole life time of the engine without causing any troubles.

Another object of the present invention is to provide a piston assembly comprising a top part, a body part and a gudgeon pin, which can withstand increased cylinder pressures. The piston assembly is also configured to have a cooling gallery inside for keeping the piston temperature effectively in an acceptable level. An objective of the invention is to improve the fatigue resistance of the gudgeon pin. An objective is also to reduce the surface pressure between the body part and the gudgeon pin.

The present invention of the piston assembly is characterized in that the gudgeon pin is configured to be assembled and lockable by locking means to the aperture of the body part in a given rotational orientation such that there is provided a conduit for supplying cooling oil from the connecting rod via the gudgeon pin to the bosses and further to a cooling gallery between the top part and the body part, said conduit is formed through the gudgeon pin as a cross sectionally closed conduit. The present invention also concerns the body part and the gudgeon pin for use in said piston assembly or a part of the piston assembly and an engine using said piston assembly.

When the gudgeon pin is lockable to a given rotational orientation in relation to the body part it is possible to provide a conduit through the gudgeon pin. Thus it can be avoided to form a conduit on the arc, such as a groove, beside or at the interface between the gudgeon pin and the body part. The effect of this feature is to enable the formation of a cross sectionally closed conduit or bore to a preferred location at the gudgeon pin and/or to the body part. This preferred location may take in to account the specific shape of parts and other issues especially relating to the fatigue resistance. As the gudgeon pin is exposed to a continuous alternating load, it makes big difference if the gudgeon pin can be designed so that the conduits are located in those less stressed areas than in the peak stress areas. Also the cross-section area of the conduit can be determined according to a wanted flow rate. Also when the formation of the oil channel is avoided at the body part or gudgeon pin surface, as a so called oil groove, the bearing surface area of the gudgeon pin is increased considerable. The increase in the bearing surface area affects directly to the fatigue resistance in the manner of decreased surface pressure but in addition also as the usable surface pressure can be increased because of the stationary contact between the parts. Preferably the given rotational orientation of gudgeon pin is limited to be floating within ±1.0°, preferably ±0.3 to 0.5° of rotation. Still in addition the geometrical factor of the assembled parts can be improved by designing the shapes such that the end result is also in that sense optimal.

For supplying the cooling oil to the cooling gallery between the body part and the top part the conduit need to be designed in a certain diameter or cross sectional area depending on the needed cooling capacity of the oil. One factor determining the flow rate at the conduit is a capacity of a primary oil pump, but also the directions of said conduits and the acceleration caused by the reciprocating motion of the piston in a running engine. In some engines this acceleration may exceed 200 G (where 1 G is 9.81 m/s$^2$) and therefore the directions of the conduits in relation to the acceleration directions affect significantly to the flow of the cooling oil.

DEFINITIONS

In this context it is defined a piston plane (PP) which is a plane perpendicular to central axis of the piston ((CA) i.e. moving direction of the piston when in use) and parallel to central axis of the gudgeon pin (or aperture for gudgeon pin).

In this context a cooling gallery means a hollow space between the top part and the body part of the piston wherein an amount of piston cooling fluid (normally lubrication oil)

can be led for removing the superfluous heat caused by combustion of fuel in the cylinder.

BRIEF DESCRIPTION OF THE DRAWING FIGURES

Figure 2:
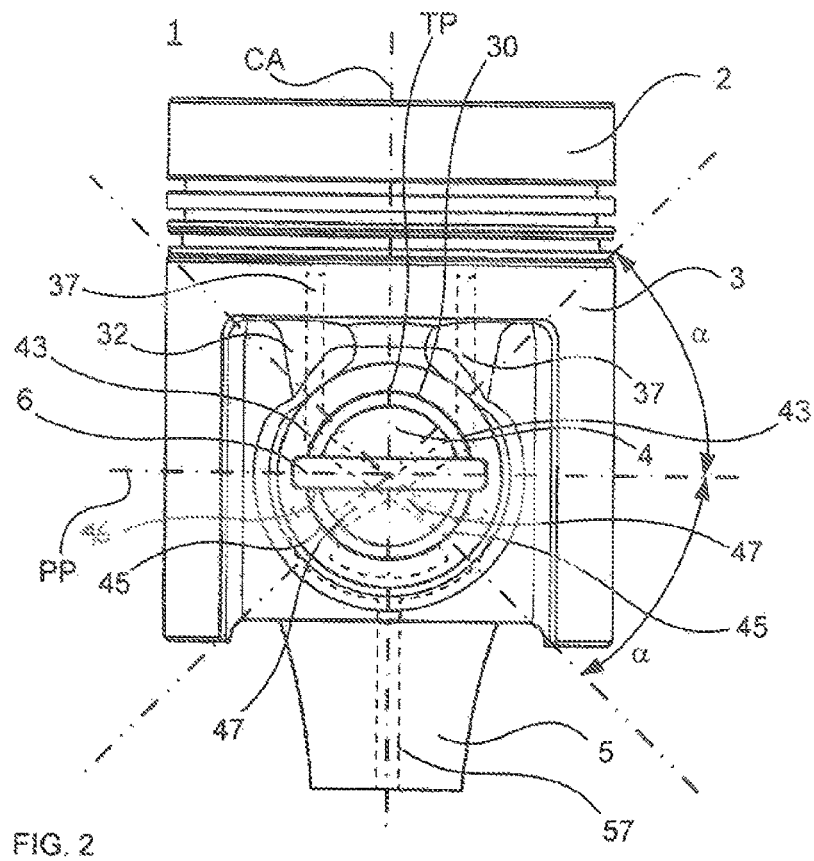
Figure 3:
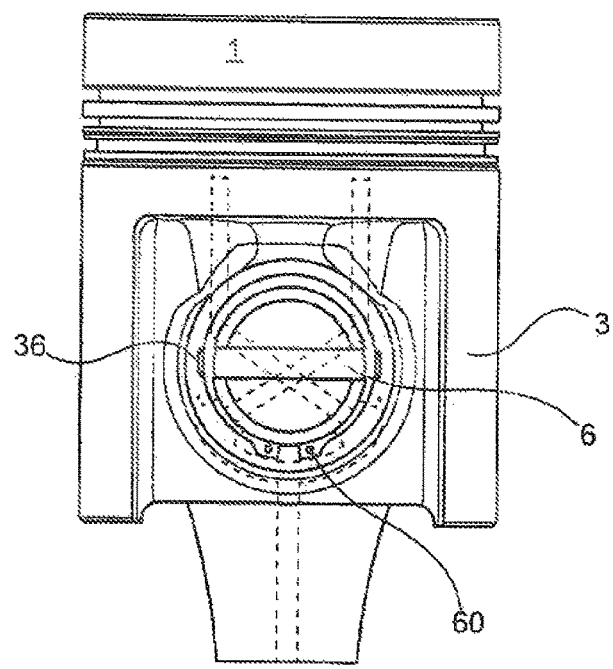
Figure 4:
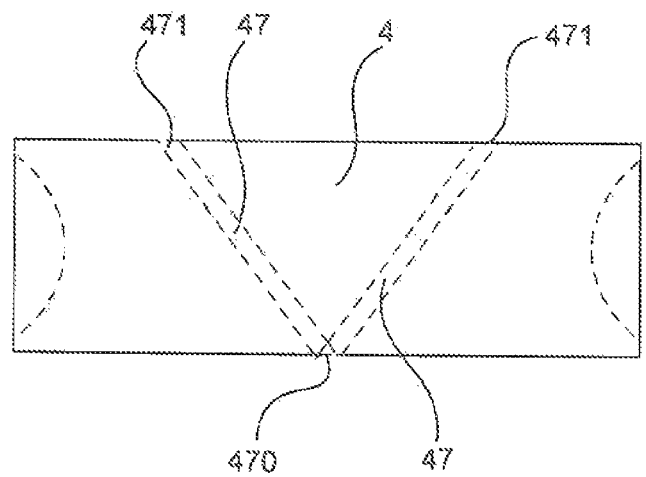

In the following the invention will be described in detail with reference to the accompanying figures wherein:

FIG. 1 presents a cross section view of a piston and gudgeon pin assembly;

FIG. 2 presents a side view of a piston and gudgeon pin assembly;

FIG. 3 presents another side view of an embodiment of a piston and gudgeon pin assembly;

FIG. 4 present an embodiment of the conduit arrangement in the gudgeon pin;

FIGS. 5 to 6A, 6B, 6C, and 6D presents different embodiments of locking means in connection with the gudgeon pin and the body part.

DETAILED DESCRIPTION OF THE INVENTION

In FIG. 1 it is presented a cross sectional view along central axis of the piston and gudgeon pin assembly. It presents a piston 1 assembly for internal combustion diesel engine having a piston diameter D of 160 to 650 mm, the piston 1 assembly comprising a top part 2 and a body part 3 and a gudgeon pin 4 connectable to each other, the top part 2 defining, when installed in a cylinder of the engine, the piston 1 side of a combustion chamber, and the body part 3 having an aperture 30 for a gudgeon pin 4, bosses 32 for distributing forces, when in use, between the piston 1 and the gudgeon pin 4, the body part 3 having an interior 33, an outer surface 34 and operable connecting surfaces 35 (such as the surface dividing the top part and the body part), the gudgeon pin 4 for connecting the piston 1 to a connecting rod 5 of the engine in a pivotal manner, the gudgeon pin 4 is configured to be assembled and lockable by locking means 6 to the aperture 30 of the body part 3 in a given rotational orientation such that there is provided a conduit 57, 47, 37 for supplying cooling oil from the connecting rod 5 via the gudgeon pin 4 to the bosses 32 and further to a cooling gallery 23 between the top part 2 and the body part 3, said conduit 47 is formed through the gudgeon pin 4 as a cross sectionally closed conduit 47.

In FIG. 1 it is presented that the body part 3 is provided with locking means 36 for determining the rotational orientation and axial locking means 60 for determining an axial position with predetermined clearance of the assembled gudgeon pin 4 in the aperture 30. This embodiment of locking means 36, 6 illustrates a horizontal pin/bar type locking. Also the gudgeon pin 4 comprises an end shape apt to corresponding shape of the locking means 6. The locking means 6 may comprise a detachable pin which is configured to fit to a slot at the end of the gudgeon pin 46 so that the clearance between the pin and the slot allows the gudgeon pin to position itself to the predetermined angle. An embodiment of the axial locking means 60 shown in FIG. 1 is one of the most common in this field, a washer like locking ring.

In FIG. 1 it is illustrated one embodiment where the both ends of gudgeon pin 4 are provided with a chamfer 49 of conical, truncated cone, parabolic or corresponding shape. The effect of this shape is to relief the weight of the gudgeon pin 4 but also to partly direct forces in a desired way. As the gudgeon pin 3 deforms under heavy load, the material inside the gudgeon pin 3 prevents the ovalisation of the gudgeon pin 3. However at the end of the gudgeon pin the force flux bends slightly towards the center line of the connecting rod 5 and thus the end of the gudgeon pin is preferably chamfered.

In FIG. 2 it is presented a side view of a piston 1 assembly comprising a top part 2, a body part 3, a gudgeon pin 4 and a connecting rod 5. Central axis CA of the piston assembly presents the moving direction when the piston is in use. Also the conduit route comprising conduits 57, 47, 37 through said parts 5, 4, 3 are schematically presented. In the FIG. 2 the conduit inlet/outlet interface 43 between the body part 3 and the gudgeon pin 4 is located on the periphery of the gudgeon pin 4 at an angle α of 0 to 45° above a piston plane (PR) so that the conduit 37 is configured to the body part bosses 32 at least 45° away from the top position TP of the gudgeon pin aperture 30. Correspondingly, the conduit inlet/outlet interface 45 between the connecting rod 5 and the gudgeon pin 4 is located on the periphery of the gudgeon pin 4 at an angle α of 0 to 45° below a piston plane (PP). However, as the connecting rod 5 has a pivotable connection in relation to gudgeon pin 4, this above mentioned inlet/outlet interface 45 needs to be designed so that it takes in to account this pivotal movement when the engine is under operation and running.

In FIG. 3 it is presented the piston assembly of FIG. 2 from the opposite direction. As the referred parts are the same as in FIG. 2, the geometry of different items is more clearly visible. Also the body part 3 is provided with locking means 36 for determining the rotational orientation and axial locking means 60 for determining an axial position with predetermined clearance of the assembled gudgeon pin in the aperture 30. According to an embodiment the gudgeon pin 4 comprises an end shape apt to corresponding shape of the locking means 6 and preferably it restricts the given rotational orientation of gudgeon pin so that it is limited to be floating within ±1.0°, preferably ±0.3 to 0.5" of rotation.

As one can note when studying the embodiments of FIG. 1 and FIG. 2 that the conduit 47 in the gudgeon pin 4 may formed as a I-, V-, Y-shaped among other possibilities (I-shape presented in FIGS. 1 and 2). One possible embodiment of the gudgeon pin 4 is shown in FIG. 4 (view as perpendicular to a plane at rotation of α), wherein there is a conduit 47 in the gudgeon pin 4 and it is formed as V-shaped by two borings 47 so that the conduits extend in radial direction directly through the gudgeon pin and in axial direction the conduits 47 are inclined so that the inlet 470 is at the area of connecting rod and outlet 471 is at the area of body part bosses. Thus the cooling oil may flow from the conduit 57 of the connecting rod 5 and through the borings 47 to the conduits 37 of bosses 32 of body part (not shown in FIG. 4).

Figure 5:
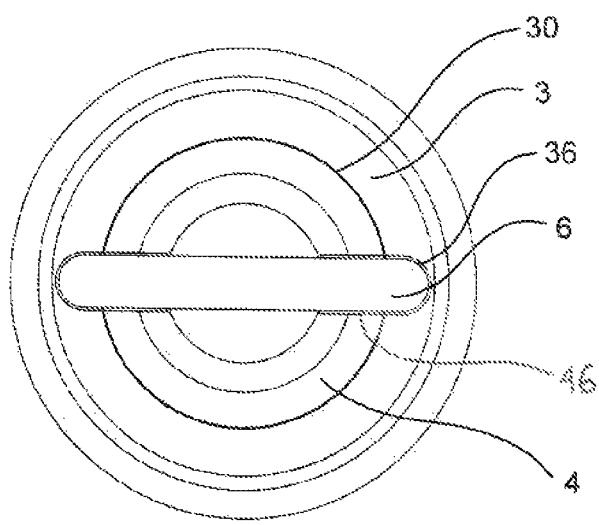

In FIG. 5 it is presented a detailed view where the gudgeon pin 4 is assembled and locked by locking means 6 to the aperture 30 of the body part 3 in a given rotational orientation. The locking means 6 comprises a detachable pin which is configured to fit to a slot at the end of the gudgeon pin so that the clearance between the pin and the slot allows the gudgeon pin to position itself to the predetermined angle and allows the gudgeon pin to float within the prescribed clearance in the rotational direction. The body part 3 is also provided with corresponding locking means 36 for determining the rotational orientation.

Figure 6A:
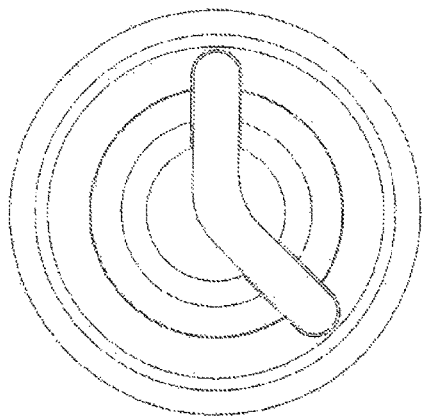
Figure 6B:
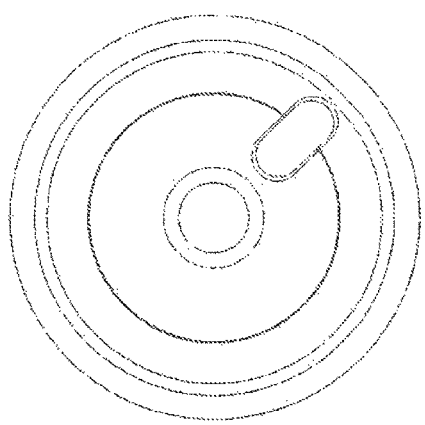
Figure 6C:
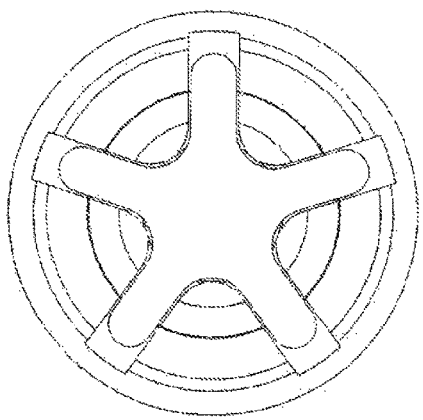
Figure 6D:
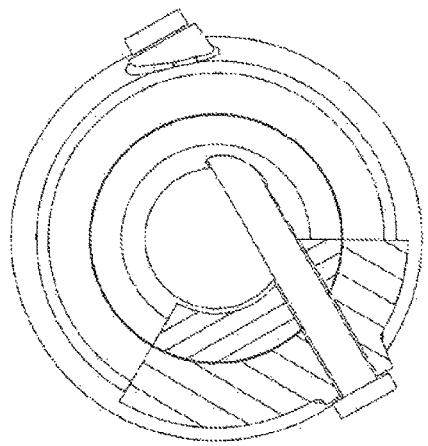

In FIGS. 6A, 6B, 60 and 60 it is presented various embodiments of the locking means as explained in relation to the FIG. 5.

The detailed description of the invention is not intended to disclose all the possible embodiments but the invention may be varied within the appended patent claims.

REFERENCE SIGNS IN THE FIGURES

1 Piston assembly
2 top part
23 cooling gallery
3 body part
30 aperture for gudgeon pin
32 boss
33 interior of body part
34 outer surface
35 operable connecting surfaces
36 locking means
37 conduit (at body part)
4 gudgeon pin
43 conduit inlet/outlet interface (gudgeon pin/body part)
45 conduit inlet/outlet interface (gudgeon pin/connecting rod)
47 conduit (through the gudgeon pin)
470 inlet
471 outlet
49 chamfer
5 connecting rod
57 conduit (at connecting rod)
6 locking means
60 axial locking means
α rotational angle from PP
CA central axis of the piston assembly
D diameter
PP piston plane
TP top position

The invention claimed is:

1. A piston (1) assembly for an internal combustion diesel engine having a piston diameter (D) of 160 to 650 mm, the piston (1) assembly comprising:
 a top part (2) and a body part (3) and a gudgeon pin (4) connectable to each other,
  the top part (2) defining, when installed in a cylinder of the engine, the piston (1) side of a combustion chamber,
  the body part (3) having an aperture (30) for the gudgeon pin (4), bosses (32) for distributing forces, when in use, between the piston (1) and the gudgeon pin (4), the body part (3) having an interior (33), an outer surface (34) and operable connecting surfaces (35), and
  the gudgeon pin (4) for connecting the piston (1) to a connecting rod (5) of the engine in a pivotal manner,
 wherein the gudgeon pin (4) is configured to be assembled and lockable by locking means (6) to the aperture (30) of the body part (3) in a given rotational orientation such that there is provided a conduit (57, 47, 37) for supplying cooling oil from the connecting rod (5) via the gudgeon pin (4) to the bosses (32) and further to a cooling gallery (23) between the top part (2) and the body part (3), said conduit (47) is formed through the gudgeon pin (4) as a cross sectionally closed conduit (47), and
 wherein an inlet/outlet interface (43) between the body part (3) and the gudgeon pin (4) is located on the periphery of the gudgeon pin (4) at 0 to 45° above a piston plane (PP), the piston plane (PP) being a plane perpendicular to a central axis of the piston and parallel to a central axis of the gudgeon pin, so that the conduit (37) is configured to the body part bosses (32) at least 45° away from the top position of the gudgeon pin aperture (30).

2. The piston assembly according to claim 1 wherein an inlet/outlet interface (45) between the connecting rod (5) and the gudgeon pin (4) is located on the periphery of the gudgeon pin (4) at 0 to 45° below the piston plane (PP).

3. The piston assembly according to claim 1 wherein the given rotational orientation of gudgeon pin (4) is limited to be floating within ±1.0° of rotation.

4. The piston assembly according to claim 1 wherein the body part (3) is provided with locking means (36) for determining the rotational orientation and axial locking means (60) for determining an axial position with predetermined clearance of the assembled gudgeon pin in the aperture (30).

5. The gudgeon pin (4) for use in a piston assembly according to claim 1 wherein the gudgeon pin (4) comprises an end shape apt to corresponding shape of the locking means (6).

6. The gudgeon pin (4) for use in a piston assembly according to claim 1 wherein the conduit (47) in the gudgeon pin (4) is I-shaped.

7. The gudgeon pin (4) for use in a piston assembly according to claim 1 wherein, the both ends of gudgeon pin (4) are provided with a chamfer (49) of conical, truncated cone, parabolic or corresponding shape.

8. The gudgeon pin (4) for use in a piston assembly according to claim 1 wherein the body part (3) is provided with radial locking means (6) for determining the rotational orientation and axial locking means (60) for determining an axial position of the assembled gudgeon pin (4) in the aperture (30).

9. The gudgeon pin (4) for use in a piston assembly according to claim 8 wherein the locking means (6) comprises a detachable pin which is configured to fit to a slot at the end of the gudgeon pin (4) so that the clearance between the pin and the slot allows the gudgeon pin (4) to position itself to the predetermined angle.

10. An engine comprising the piston assembly according to claim 1.

11. The engine of claim 10 characterized in that the engine comprises plurality of said piston assemblies.

12. The piston assembly according to claim 1 wherein the given rotational orientation of gudgeon pin (4) is limited to be floating within ±0.3 to 0.5° of rotation.

13. The gudgeon pin (4) for use in a piston assembly according to claim 1 wherein the conduit (47) in the gudgeon pin (4) is V-shaped.

14. The gudgeon pin (4) for use in a piston assembly according to claim 1 wherein the conduit (47) in the gudgeon pin (4) is Y-shaped.

15. The gudgeon pin (4) for use in a piston assembly according to claim 1 wherein, the both ends of gudgeon pin (4) are provided with a chamfer (49) of conical shape.

16. The gudgeon pin (4) for use in a piston assembly according to claim 1 wherein, the both ends of gudgeon pin (4) are provided with a chamfer (49) of truncated cone shape.

17. The gudgeon pin (4) for use in a piston assembly according to claim 1 wherein, the both ends of gudgeon pin (4) are provided with a chamfer (49) of parabolic shape.

* * * * *